(12) United States Patent
Liang et al.

(10) Patent No.: US 11,606,892 B2
(45) Date of Patent: Mar. 21, 2023

(54) MILITARY SHOVEL

(71) Applicant: BINOVO MANUFACTURING CO., LTD, Guangdong (CN)

(72) Inventors: Houkun Liang, Guangdong (CN); Zhiwen Liang, Guangdong (CN)

(73) Assignee: BINOVO MANUFACTURING CO., LTD., Guangdong (CN)

( * ) Notice: Subject to any disclaimer, the term of this patent is extended or adjusted under 35 U.S.C. 154(b) by 308 days.

(21) Appl. No.: 16/897,297

(22) Filed: Jun. 10, 2020

(65) Prior Publication Data
US 2020/0390017 A1 Dec. 17, 2020

(30) Foreign Application Priority Data
Jun. 15, 2019 (CN) .......................... 201920899027.7

(51) Int. Cl.
*A01B 1/22* (2006.01)
(52) U.S. Cl.
CPC ...................................... *A01B 1/22* (2013.01)
(58) Field of Classification Search
CPC ........................................................ A01B 1/22
See application file for complete search history.

(56) References Cited

U.S. PATENT DOCUMENTS

| | | | | |
|---|---|---|---|---|
| 1,500,132 A * | 7/1924 | Hummelgard | ......... | A01B 1/022 294/51 |
| 5,056,952 A * | 10/1991 | Gringer | .................. | F16M 13/02 403/103 |
| 5,425,153 A * | 6/1995 | Vosbikian | ................ | A47L 13/52 15/257.7 |
| 5,548,864 A * | 8/1996 | Vosbikian | ................ | B25G 3/38 403/103 |
| 5,624,199 A * | 4/1997 | Cheng | .................. | A47D 13/063 403/92 |
| 9,096,988 B2 | 8/2015 | Price | | |
| 2002/0088088 A1 | 7/2002 | Lin | | |
| 2014/0070556 A1* | 3/2014 | Price | ........................ | A01B 1/04 294/50.6 |
| 2017/0297191 A1* | 10/2017 | Chou | ........................ | B25G 1/00 |

FOREIGN PATENT DOCUMENTS

| | | | |
|---|---|---|---|
| CN | 201693524 U | | 1/2011 |
| CN | 202862161 U | | 4/2013 |
| CN | 204634270 U | * | 9/2015 |
| CN | 103286749 B | | 4/2016 |

(Continued)

*Primary Examiner* — Stephen A Vu
(74) *Attorney, Agent, or Firm* — Gang Yu

(57) ABSTRACT

Provided is a military shovel, including a shovel head and a shovel handle; a rear end of the shovel head is provided with a connection seat; a front end of the shovel handle is provided with a connection head; the connection seat of the shovel head is hinged to the connection head by a hinge shaft; the military shovel further includes a locking mechanism for fixing the shovel head, the locking mechanism is disposed on the front end of the shovel handle; three locating holes are provided in a sidewall of the connection seat; a locating protrusion is disposed on a sidewall of the connection head; the sidewall of the connection seat where the three locating holes are located is opposite to the sidewall of the connection head where the locating protrusion is located.

9 Claims, 3 Drawing Sheets

(56) References Cited

FOREIGN PATENT DOCUMENTS

| | | | |
|---|---|---|---|
| CN | 205219039 U | | 5/2016 |
| CN | 206481558 U | | 9/2017 |
| CN | 207040154 U | | 2/2018 |
| CN | 207443347 U | | 6/2018 |
| CN | 207531274 U | | 6/2018 |
| CN | 109699203 A | | 5/2019 |
| GB | 2424386 A | * 9/2006 | ............. A01B 1/022 |

* cited by examiner

MILITARY SHOVEL

CROSS-REFERENCE TO RELATED APPLICATIONS

The present disclosure claims priority to Chinese Patent Application No. 201920899027.7 (application publication number CN210139368 U), filed on Jun. 15, 2019 and entitled "Military Shovel", the contents of which are hereby incorporated by reference in its entirety.

TECHNICAL FIELD

The present disclosure relates to a technical field of outdoor tools, and in particular to a military shovel.

BACKGROUND

For a military shovel known to inventors, a shovel head of the military shovel is hinged with a shovel handle of the military shovel, such that the shovel head rotates relative to the shovel handle to convert among shoveling, hoeing and folding states, and a current state of the shovel head is locked by a locking mechanism, thus meeting the use requirement. However, the military shovel known to inventors generally has a few of defects. When the current state of the shovel head is unlocked by the locking mechanism, as the shovel head is not limited at all, the shovel head automatically rotates downwards relative to the shovel handle. In this case, it is likely to hit a hand of a user to cause fear and injury, such that the use is unsafe. Moreover, as each state is not pre-limited, it is inconvenient for the user to operate the locking mechanism to fix the shovel head.

SUMMARY

For the defects of the art known to inventors, some embodiments of the present disclosure provide a military shovel that is used safely.

A technical solution provided by some embodiments of the present disclosure is as follows: a military shovel includes a shovel head and a shovel handle; a rear end of the shovel head is provided with a connection seat; a front end of the shovel handle is provided with a connection head; the connection seat of the shovel head is hinged to the connection head by a hinge shaft, such that the shovel head rotates between a shoveling state and a folding state relative to the connection head around the hinge shaft; the military shovel further includes a locking mechanism for fixing the shovel head, the locking mechanism is disposed on the front end of the shovel handle; wherein the military shovel includes a first locating hole provided in a sidewall of the connection seat and a locating protrusion disposed on a sidewall of the connection head; wherein the sidewall of the connection seat where the first locating hole is located is opposite to the sidewall of the connection head where the locating protrusion is located; and when the shovel head rotates to the shoveling state, the locating protrusion of the connection head is aligned with the first locating hole of the connection seat, and an external end of the locating protrusion stretches into the first locating hole.

In the above embodiments, by forming the first locating hole in the connection seat of the shovel head, when the shovel head rotates to the shoveling state, the locating protrusion of the connection head stretches into the first locating hole, such that after the shovel head is unlocked by the locking mechanism, the locating protrusion still limits the shovel head to keep the shovel head at the shoveling state. At this time, since a user rotates the shovel head only if separating the locating protrusion from the first locating hole, after the shovel head is unlocked by the locking mechanism, the shovel head is prevented from automatically rotating downwards relative to the shovel handle to hit a hand of the user to cause fear and injury, and thus the use is safe. Moreover, in a state that the shovel head is not locked by the locking mechanism, the locating protrusion limits the shoveling state of the shovel head, such that the shovel head does not rotate automatically, and the shovel head is also locked by the locking mechanism conveniently.

Some embodiments of the present disclosure further provides a second technical solution: a military shovel includes a shovel head and a shovel handle; a rear end of the shovel head is provided with a connection seat; a front end of the shovel handle is provided with a connection head; the connection seat of the shovel head is hinged to the connection head by a hinge shaft, such that the shovel head rotates between an opening state and a folding state relative to the connection head around the hinge shaft; the military shovel further includes a locking mechanism for fixing the shovel head, the locking mechanism is disposed on the front end of the shovel handle; wherein the military shovel includes a second locating hole provided in a sidewall of the connection seat and a locating protrusion is disposed on a sidewall of the connection head; wherein the sidewall of the connection seat where the second locating hole is located is opposite to the sidewall of the connection head where the locating protrusion is located; and when the shovel head rotates to the folding state, the locating protrusion of the connection head is aligned with the second locating hole of the connection seat, and an external end of the locating protrusion stretches into the second locating hole. In the embodiments, by forming the second locating hole in the connection seat of the shovel head, when the shovel head rotates to the folding state, the locating protrusion of the connection head stretches into the second locating hole to limit the shovel head. Therefore, after the shovel head is unlocked by the locking mechanism, the shovel head is prevented from automatically rotating downwards relative to the shovel handle to hit a hand of a user to cause fear and injury, and the shovel head is also locked by the locking mechanism conveniently.

Some embodiments of the present disclosure further provides a third technical solution: a military shovel includes a shovel head and a shovel handle; a rear end of the shovel head is provided with a connection seat; a front end of the shovel handle is provided with a connection head; the connection seat of the shovel head is hinged to the connection head by a hinge shaft, such that the shovel head rotates between an opening state and a folding state relative to the connection head around the hinge shaft; the military shovel further includes a locking mechanism for fixing the shovel head, the locking mechanism is disposed on the front end of the shovel handle; wherein the locking mechanism includes a third locating hole is provided in a sidewall of the connection seat and a locating protrusion disposed on a sidewall of the connection head; wherein the sidewall of the connection seat where the third locating hole is located is opposite to the sidewall of the connection head where the locating protrusion is located; and when the shovel head rotates to a hoeing state between the opening state and the folding state, the locating protrusion of the connection head is aligned with the third locating hole of the connection seat, and an external end of the locating protrusion stretches into the third locating hole. In the embodiments, by forming the third locating hole in the connection seat of the shovel head, when the shovel head rotates to the hoeing state between the opening state and the folding state, the locating protrusion of the connection head stretches into the third locating hole to limit the shovel head. Therefore, after the shovel head is unlocked by the locking mechanism, the shovel head is prevented from automatically rotating downwards relative to the shovel handle to hit a hand of a user to cause fear and injury, and the shovel head is also locked by the locking mechanism conveniently.

In an exemplary embodiment, the locating protrusion is telescopic, and an external end portion of the locating protrusion is of an arc surface structure. By shifting the shovel head with the hand for rotation, under an action of the arc surface structure on the external end of the locating protrusion, the locating protrusion retracts automatically to separate from the locating hole; and when the locating protrusion is aligned with the locating hole, the locating protrusion automatically stretches into the locating hole, and thus the operation is simple.

In an exemplary embodiment, a position on the sidewall of the connection head that corresponds to the locating protrusion is provided with a spring hole, a spring is disposed in the spring hole, an internal end of the locating protrusion is located in the spring hole, the internal end of the locating protrusion is abutted against the spring, and the locating protrusion can slide relative to an inner wall of the spring hole. Under an action of an elastic force of the spring, the external end of the locating protrusion is pushed out of the spring hole and compressed in the spring hole. By means of the spring, the locating protrusion automatically stretches out in a retracted state; and without an external force, the external end of the locating protrusion keeps stretching into the locating hole.

According to the military shovel provided by some embodiments of the present disclosure, by providing three locating holes in the connection seat, when the shovel head is in the shoveling, hoeing or folding state, the locating protrusion of the connection head respectively stretches into corresponding locating holes. When the shovel head is converted among the shoveling, hoeing and folding states, even though the shovel head is unlocked by the locking mechanism, the locating protrusion still limits the shovel head, such that the shovel head keeps at a current state, the unlocked shovel head is prevented from rotating downwards immediately and automatically relative to the shovel handle to hit the hand of the user to cause the fear and the injury, thus improving the safety of the military shovel; and meanwhile, after the shovel head rotates to the shoveling, hoeing or folding state to be pre-limited by the locating protrusion, the shovel head is also locked by the locking mechanism conveniently.

DETAILED DESCRIPTION OF THE EMBODIMENTS

The embodiments of the present disclosure will be further described below in combination with the accompanying drawings. The accompanying drawings are merely for exemplary illustration and cannot be understood as a limit to the present application.

In order to describe the embodiments more simply, some parts known to those skilled in the art but unrelated to main contents of the disclosure in the accompanying drawings or description are omitted to some extent. In addition, for ease of description, some parts in the accompanying drawings are omitted, amplified or shrunk, and do not represent the dimension or all structures of an actual product.

Embodiment

Figure 1:
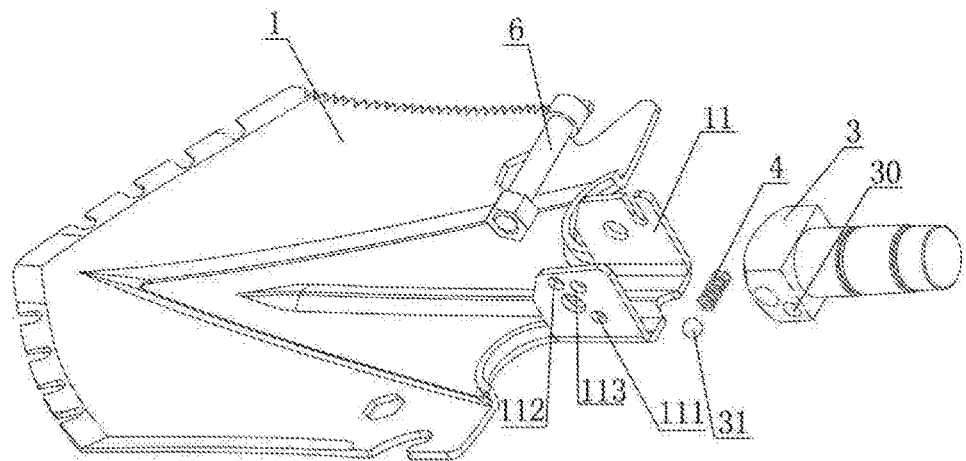
FIG. 1 illustrates a breakdown structural schematic diagram of a shovel head and a connection head of a military shovel according to an embodiment of the disclosure.
Figure 2:
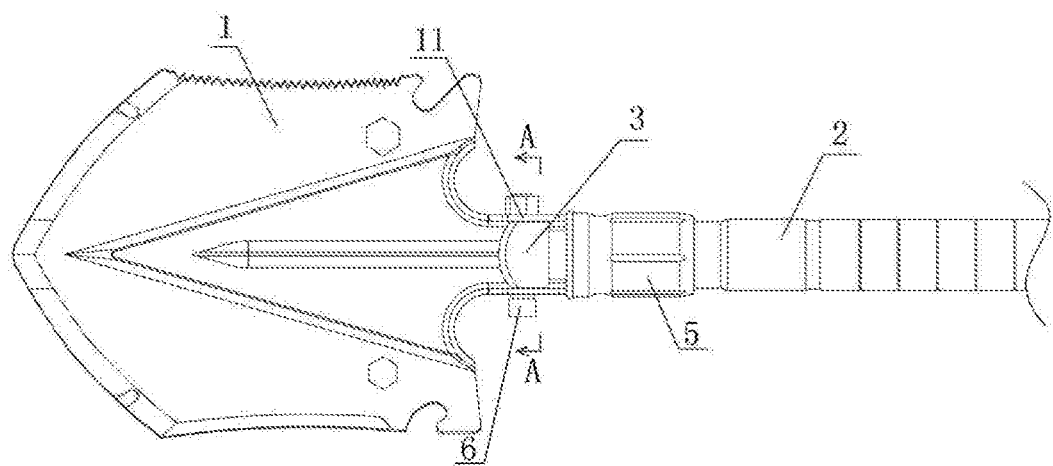
FIG. 2 illustrates a structural schematic diagram of a military shovel according to an embodiment of the disclosure.

As shown in FIG. 1 and FIG. 2, the embodiment provides a military shovel, which includes a shovel head 1 and a shovel handle 2; a rear end of the shovel head 1 is provided with a connection seat 11; a front end of the shovel handle 2 is provided with a connection head 3; the front end of the shovel handle 2 includes a hollow structure; a rear end of the connection head 3 is inserted into the front end of the shovel handle 2, and is in threaded connection with an inside of the front end of the shovel handle 2; the connection seat 11 of the shovel head 1 is hinged to the connection head 3 of the shovel handle 2 by a hinge shaft 6, such that the shovel head 1 rotates between a shoveling state and a folding state relative to the connection head 3 around the hinge shaft 6; the military shovel further includes a locking mechanism for fixing the shovel head 1, the locking mechanism is disposed on the front end of the shovel handle 2; in the embodiment, the locking mechanism includes a locking cylinder 5; the locking cylinder 5 is sleeved to the outside of the front end of the shovel handle 2, and an inside of the locking cylinder 5 is in threaded connection with an outside of the shovel handle 2, such that the locking cylinder 5 rotates relative to the shovel handle 2 to move back and forth; and when the locking cylinder 5 is rotated to move forwards relative to the shovel handle 2, a front end of the locking cylinder 5 is abutted against an edge of the connection seat 11; and in this way, the shovel head 1 is fixed, and the shovel head 1 is prevented from rotating relative to the shovel handle 2.

In an embodiment, the military shovel includes a first locating hole 111, a second locating hole 112 and a third locating hole 113, the first locating hole 111, the second locating hole 112 and the third locating hole 113 are provided in a sidewall of the connection seat 11. The first locating hole 111, the second locating hole 112 and the third locating hole 113 are disposed around the hinge shaft. In an embodiment, the first locating hole 111, the second locating hole 112 and the third locating hole 113 are all round holes, and are located on a same sidewall of the connection seat 11; centers of the first locating hole 111, the second locating hole 112 and the third locating hole 113 are all located on a circumference that takes an axial center of the hinge shaft 6 as a circle center; a locating protrusion 31 is disposed on a sidewall of the connection head 2; in an embodiment, an external end portion of the locating protrusion 31 is of an arc surface structure; and the sidewall of the connection seat 11 where the first locating hole 111, the second locating hole 112 and the third locating hole 113 are located is opposite to the sidewall of the connection head 3 where the locating protrusion 31 is located.

Figure 4:
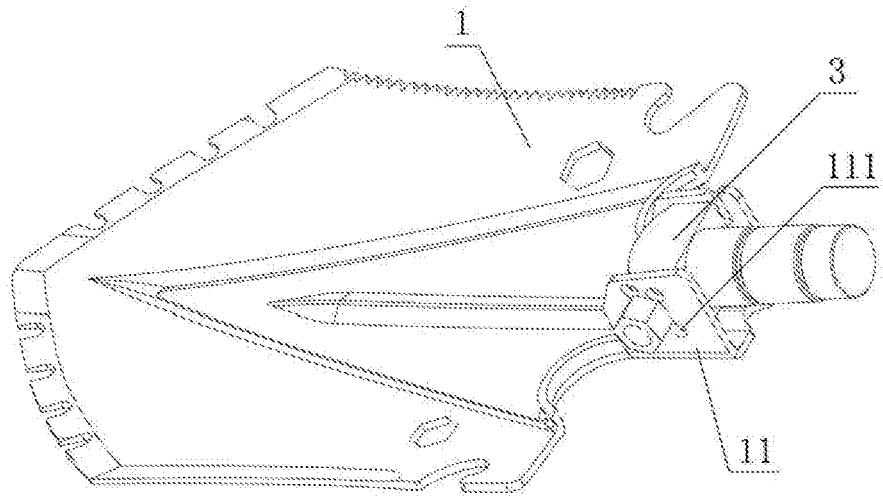
FIG. 4 illustrates a structural schematic diagram of a military shovel in a shoveling state according to an embodiment of disclosure (a shovel handle is not drawn).
Figure 5:
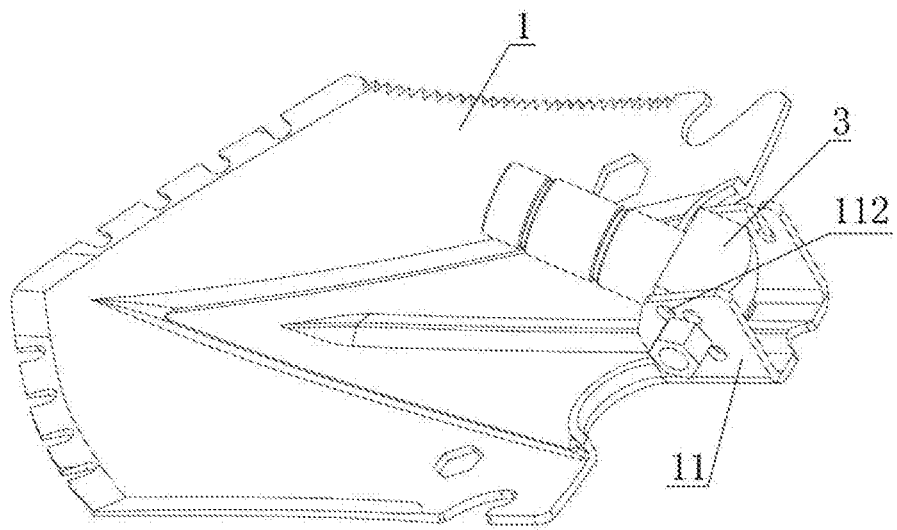
FIG. 5 illustrates a structural schematic diagram of a military shovel in a folding state according to an embodiment of the disclosure (a shovel handle is not drawn).
Figure 6:
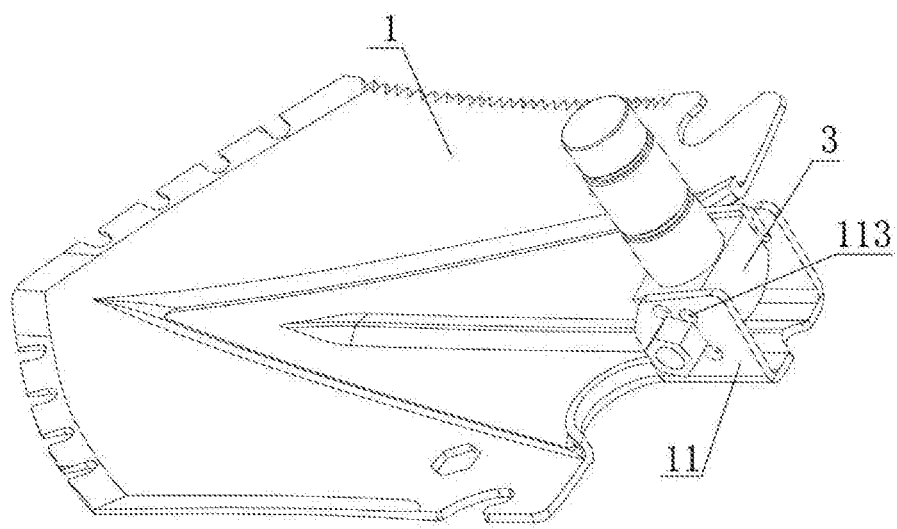
FIG. 6 illustrates a structural schematic diagram of a military shovel in a hoeing state according to an embodiment of the disclosure (a shovel handle is not drawn).

When the shovel head 1 rotates to a shoveling state, as shown in FIG. 4, the locating protrusion 31 of the connection head 3 is aligned with the first locating hole 111 of the connection seat 11, and an external end of the locating protrusion 31 stretches into the first locating hole 11. When the shovel head 1 rotates to a folding state, as shown in FIG. 5, the locating protrusion 31 of the connection head 3 is aligned with the second locating hole 112 of the connection seat 11, and the external end of the locating protrusion 31 stretches into the second locating hole 112. When the shovel head 1 rotates to a hoeing state between an opening state and the folding state, as shown in FIG. 6, the locating protrusion 31 of the connection head 3 is aligned with the third locating hole 113 of the connection seat 11, and the external end of the locating protrusion 31 stretches into the third locating hole 113.

In the above embodiment of the present disclosure, as the external end portion of the locating protrusion 31 is of the arc surface structure, when the shovel head is in any state of the shoveling, hoeing and folding states, by shifting the shovel head 1 to rotate, under an action of the arc surface structure on the external end of the locating protrusion 31, a distance between a sidewall of the connection seat 11 and the sidewall of the connection head 2 is increased under mutual squeezing between the locating protrusion 31 and a hole wall of the locating hole because the sidewall of the connection seat 11 has a certain elasticity, and thus the locating protrusion 31 is separated from the locating hole.

Figure 3:
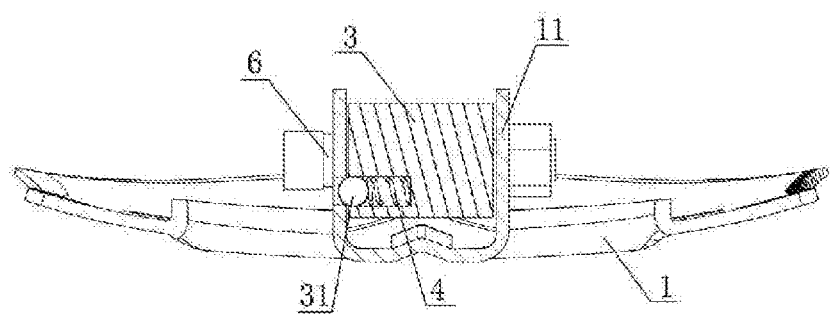
FIG. 3 illustrates a sectional view of an A-A portion in FIG. 2.

In an embodiment of the present disclosure, as shown in FIG. 1 and FIG. 3, a position on the sidewall of the connection head 3 that corresponds to the locating protrusion 31 is provided with a spring hole 30, a spring 4 is disposed in the spring hole 30. In an embodiment, the locating protrusion 31 is a round bead body, an internal end of the locating protrusion 31 is located in the spring hole 30, the internal end of the locating protrusion 31 is abutted against the spring 4, and the locating protrusion 31 slides back and forth in the spring hole 30. Under an action of an elastic force of the spring 4, an external end of the locating protrusion 31 is automatically reset to stretch out of the spring hole 30 when retracting to the spring hole 30. By means of the embodiment, the sidewall of the connection seat 11 does not need to be elastic. When the shovel head is in any state of the shoveling, hoeing and folding states, by shifting the shovel head 1 to rotate, the hole wall of the locating hole squeezes an arc surface on the external end of the locating protrusion 31, and the locating protrusion 31 automatically compresses the spring 4 to retract to the spring hole 30, such that the external end of the locating protrusion 31 is separated from the locating hole. When the locating protrusion 31 is aligned with the locating hole, the locating protrusion 31 is automatically reset under the action of the elastic force of the spring 4, and the external end of the locating protrusion 31 stretches out of the spring hole 30 and stretches into the locating hole.

In the embodiment, the military shovel has a following principle in use: supposing that the shovel head 1 needs to convert from the shoveling state to the hoeing state, the external end of the locating protrusion 31 stretches into the first locating hole 111 in the shoveling state; during conversion, the locking cylinder 5 rotates first to move backwards relative to the shovel handle 2, such that the front end of the locking cylinder 5 is separated from the edge of the connection seat 11 for a certain distance, thereby ensuring that when the shovel head 1 rotates, the connection seat 11 is not contacted with the front end of the locking cylinder 5; and at this time, the locating protrusion 31 further keeps in a state of stretching into the first locating hole 111. The shovel head 1 is limited by the locating protrusion 31 to keep static relative to the connection head 3. At this time, it is necessary for the user to shift the shovel head 1 in a direction towards the hoeing state to rotate. During rotation of the shovel head 1, the hole wall of the first locating hole 111 squeezes the arc surface on the external end of the locating protrusion 31, the locating protrusion 31 automatically compresses the spring 4 to retract to the spring hole 30 till the external end of the locating protrusion 31 is separated from the first locating hole 111, and the shovel head 1 rotates continuously till the locating protrusion 31 is aligned with the third locating hole 113 of the connection seat 11. Under the action of the elastic force of the spring 4, the external end of the locating protrusion 31 automatically stretches into the third locating hole 113; and at this time, the shovel head 1 is in the hoeing state. At last, the locking cylinder rotates to move forwards relative to the shovel handle 2, such that the front end of the locking cylinder 5 is abutted against the edge of the connection seat 11, and the shovel head 1 is fixed at a position of the hoeing state.

The operation that the shovel head 1 is converted between any two states of the shoveling, hoeing and folding states is the same as the above description, and is not elaborated herein.

In the embodiment, the military shovel prevents the shovel head 1 from rotating downwards immediately and automatically to hit a hand of a user to cause fear and injury after the shovel head 1 is loosened by the locking cylinder 5, thereby improving the safety of the military shovel; and after the shovel head 1 rotates to the shoveling, hoeing or folding state to be pre-limited by the locating protrusion 31, the shovel head 1 keeps static, and the shovel head 1 is locked by the locking cylinder 5 conveniently.

The above described implementation modes of the embodiments of the disclosure are not constituted into any limit a scope of protection of the disclosure. Any modification, equivalent replacement, improvement and the like made within a spirit and a principle of the disclosure should be included in the scope of protection of the claims of the disclosure.

What is claimed is:

1. A military shovel, comprising a shovel head and a shovel handle, wherein a rear end of the shovel head is provided with a connection seat, a front end of the shovel handle is provided with a connection head, the connection seat of the shovel head is hinged to the connection head by a hinge shaft, such that the shovel head rotates between a shoveling state and a folding state relative to the connection head around the hinge shaft, the military shovel further comprises a locking mechanism for fixing the shovel head, the locking mechanism is disposed on the front end of the shovel handle, wherein the military shovel comprises a first locating hole provided in a sidewall of the connection seat and a locating protrusion disposed on a sidewall of the connection head, wherein the sidewall of the connection seat where the first locating hole is located is opposite to the sidewall of the connection head where the locating protrusion is located, and when the shovel head rotates to the shoveling state, the locating protrusion of the connection head is aligned with the first locating hole of the connection seat, and an external end of the locating protrusion stretches into the first locating hole;

wherein the locating protrusion is telescopic, and an external end portion of the locating protrusion is of an arc surface structure;

wherein the military shovel comprises a second locating hole provided in a sidewall of the connection seat, wherein the sidewall of the connection seat where the second locating hole is located is opposite to the sidewall of the connection head where the locating protrusion is located, and when the shovel head rotates to the folding state, the locating protrusion of the connection head is aligned with the second locating hole of the connection seat, and an external end of the locating protrusion stretches into the second locating hole.

2. The military shovel as claimed in claim 1, wherein the military shovel further comprises a spring hole disposed on a position on the sidewall of the connection head that corresponds to the locating protrusion; and a spring disposed in the spring hole, wherein an internal end of the locating protrusion is located in the spring hole, the internal end of the locating protrusion is abutted against the spring, and the locating protrusion is slidable relative to an inner wall of the spring hole.

3. The military shovel as claimed in claim 1, wherein the first locating hole and the second locating hole are disposed around the hinge shaft.

4. The military shovel as claimed in claim 1, wherein the locking mechanism comprises a third locating hole provided in a sidewall of the connection seat, wherein the sidewall of the connection seat where the third locating hole is located is opposite to the sidewall of the connection head where the locating protrusion is located, and when the shovel head rotates to a hoeing state between the opening state and the folding state, the locating protrusion of the connection head is aligned with the third locating hole of the connection seat, and an external end of the locating protrusion stretches into the third locating hole.

5. The military shovel as claimed in claim 4, wherein the first locating hole and the third locating hole are disposed around the hinge shaft.

6. A military shovel, comprising a shovel head and a shovel handle, wherein a rear end of the shovel head is provided with a connection seat, a front end of the shovel handle is provided with a connection head, the connection seat of the shovel head is hinged to the connection head by a hinge shaft, such that the shovel head rotates between an opening state and a folding state relative to the connection head around the hinge shaft, the military shovel further comprises a locking mechanism for fixing the shovel head, the locking mechanism is disposed on the front end of the shovel handle, wherein the military shovel comprises a second locating hole provided in a sidewall of the connection seat and a locating protrusion is disposed on a sidewall of the connection head, wherein the sidewall of the connection seat where the second locating hole is located is opposite to the sidewall of the connection head where the locating protrusion is located, and when the shovel head rotates to the folding state, the locating protrusion of the connection head is aligned with the second locating hole of the connection seat, and an external end of the locating protrusion stretches into the second locating hole;

wherein the locating protrusion is telescopic, and an external end portion of the locating protrusion is of an arc surface structure;

wherein the military shovel comprises a first locating hole provided in a sidewall of the connection seat and a locating protrusion disposed on a sidewall of the connection head, wherein the sidewall of the connection seat where the first locating hole is located is opposite to the sidewall of the connection head where the locating protrusion is located, and when the shovel head rotates to the shoveling state, the locating protrusion of the connection head is aligned with the first locating hole of the connection seat, and an external end of the locating protrusion stretches into the first locating hole.

7. The military shovel as claimed in claim 6, wherein the military shovel further comprises a spring hole disposed on a position on the sidewall of the connection head that corresponds to the locating protrusion; and a spring disposed in the spring hole, wherein an internal end of the locating protrusion is located in the spring hole, the internal end of the locating protrusion is abutted against the spring, and the locating protrusion is slidable relative to an inner wall of the spring hole.

8. A military shovel, comprising a shovel head and a shovel handle, wherein a rear end of the shovel head is provided with a connection seat, a front end of the shovel handle is provided with a connection head, the connection seat of the shovel head is hinged to the connection head by a hinge shaft, such that the shovel head rotates between an opening state and a folding state relative to the connection head around the hinge shaft, the military shovel further comprises a locking mechanism for fixing the shovel head, the locking mechanism is disposed on the front end of the shovel handle, wherein the locking mechanism comprises a third locating hole provided in a sidewall of the connection seat and a locating protrusion disposed on a sidewall of the connection head, wherein the sidewall of the connection seat where the third locating hole is located is opposite to the sidewall of the connection head where the locating protrusion is located, and when the shovel head rotates to a hoeing state between the opening state and the folding state, the locating protrusion of the connection head is aligned with the third locating hole of the connection seat, and an external end of the locating protrusion stretches into the third locating hole;

wherein the locating protrusion is telescopic, and an external end portion of the locating protrusion is of an arc surface structure;

wherein the military shovel comprises a second locating hole provided in a sidewall of the connection seat, wherein the sidewall of the connection seat where the second locating hole is located is opposite to the sidewall of the connection head where the locating protrusion is located, and when the shovel head rotates to the folding state, the locating protrusion of the connection head is aligned with the second locating hole of the connection seat, and an external end of the locating protrusion stretches into the second locating hole.

9. The military shovel as claimed in claim 8, wherein the military shovel further comprises a spring hole disposed on a position on the sidewall of the connection head that corresponds to the locating protrusion; and a spring disposed in the spring hole, wherein an internal end of the locating protrusion is located in the spring hole, the internal end of the locating protrusion is abutted against the spring, and the locating protrusion is slidable relative to an inner wall of the spring hole.

* * * * *